UNITED STATES PATENT OFFICE.

PETER B. LAIRD, OF ST. JOHNSBURY, VERMONT.

IMPROVEMENT IN COMPOSITIONS FOR STAINING STONE.

Specification forming part of Letters Patent No. 118,865, dated September 12, 1871.

*To all whom it may concern:*

Be it known that I, PETER B. LAIRD, of St. Johnsbury, of the county of Caledonia and State of Vermont, have invented a new and useful Composition for Staining Stone; and do hereby declare the same to be fully described, as follows:

Such composition is composed of plumbago in a state of impalpable powder, an animal oil or grease, raw linseed-oil, and an essential oil, of turpentine, for instance.

In compounding the mixture I take one pound of the plumbago, two gallons of the animal oil, one quart of the raw linseed-oil, and one-half a pint of the oil of turpentine or essential oil, and thoroughly grind or mix the same together.

It will then be fit for use, and may be applied to the granite or stone surface by means of a brush or other suitable article. It makes a permanent stain, such as cannot be effaced by exposure to the weather or light.

I sometimes mix with the plumbago or mixture a small quantity of lamp-black or ivory-black, or some other pigment, for the purpose of modifying the color of it or the composition.

The invention is specially useful for staining incased surfaces or lettering cut in granite, and is being exclusively employed by me for such. Its great utility and advantage therefor have been thoroughly demonstrated.

I do not confine my composition to the precise proportions of its ingredients as hereinbefore stated, as such may be varied without materially changing the character of the compound.

I claim—

The composition described, for the purpose set forth.

PETER B. LAIRD.

Witnesses:
R. H. EDDY,
J. R. SNOW.

(105.)